Figure 1:
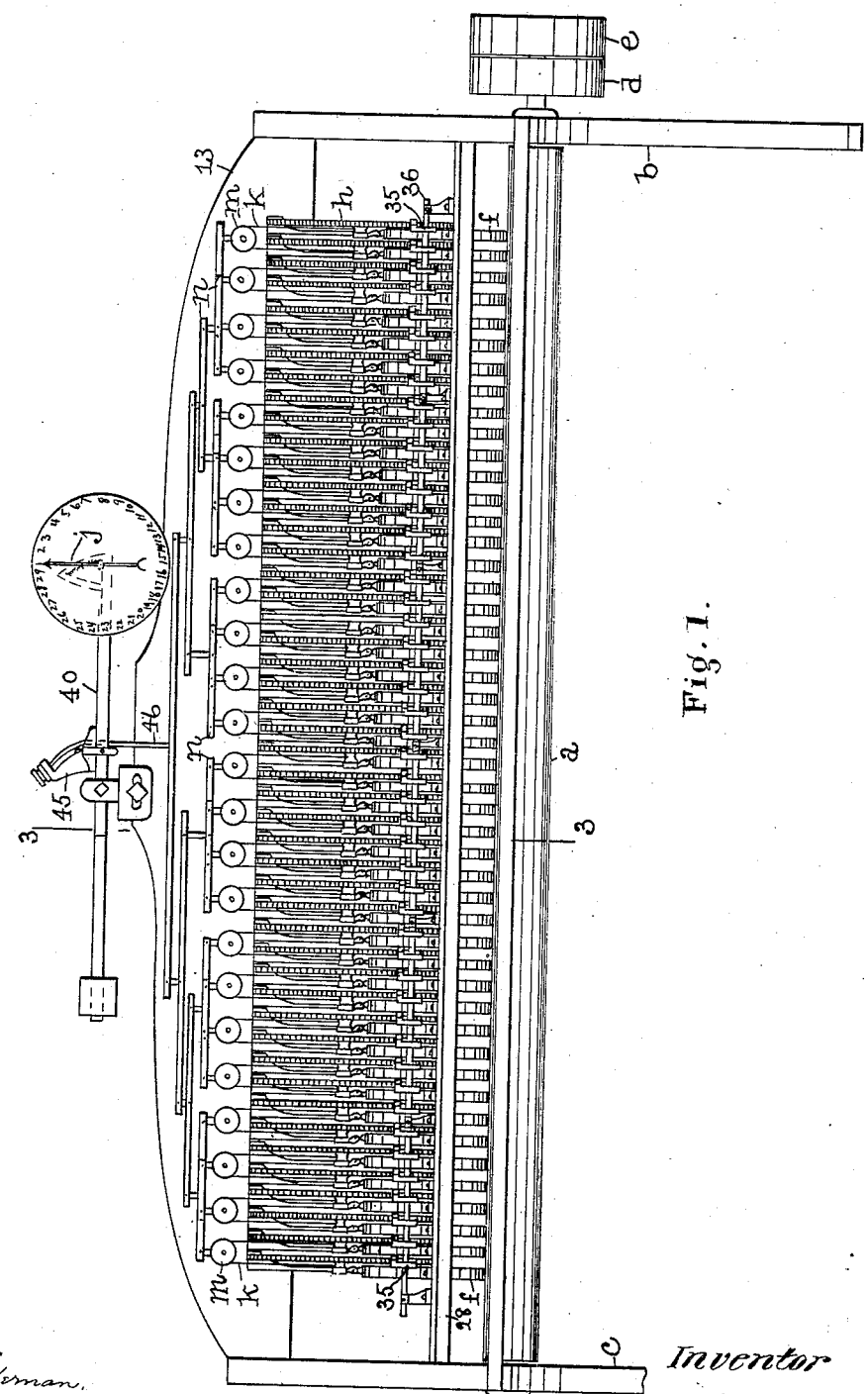

L. O. RAMSDELL.
MACHINE FOR MEASURING SURFACE AREAS.
APPLICATION FILED JAN. 16, 1908.

931,144.

Patented Aug. 17, 1909.
4 SHEETS—SHEET 1.

Witnesses.
Geo. E. McKiernan.
J. Murphy

Inventor
Lyndon O. Ramsdell
by Jas. H. Churchill
Atty.

L. O. RAMSDELL.
MACHINE FOR MEASURING SURFACE AREAS.
APPLICATION FILED JAN. 16, 1908.

931,144.

Patented Aug. 17, 1909.
4 SHEETS—SHEET 3.

Witnesses.

Inventor.
Lyndon O. Ramsdell
by Jas. H. Churchill
atty.

L. O. RAMSDELL.
MACHINE FOR MEASURING SURFACE AREAS.
APPLICATION FILED JAN. 16, 1908.
931,144.
Patented Aug. 17, 1909.
4 SHEETS—SHEET 4.
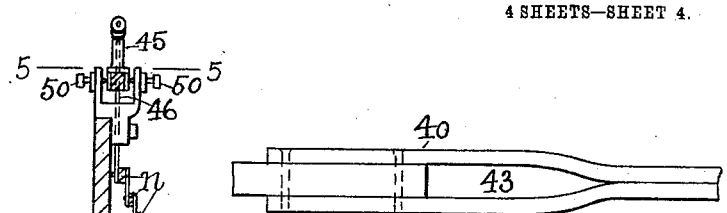
Fig. 5.
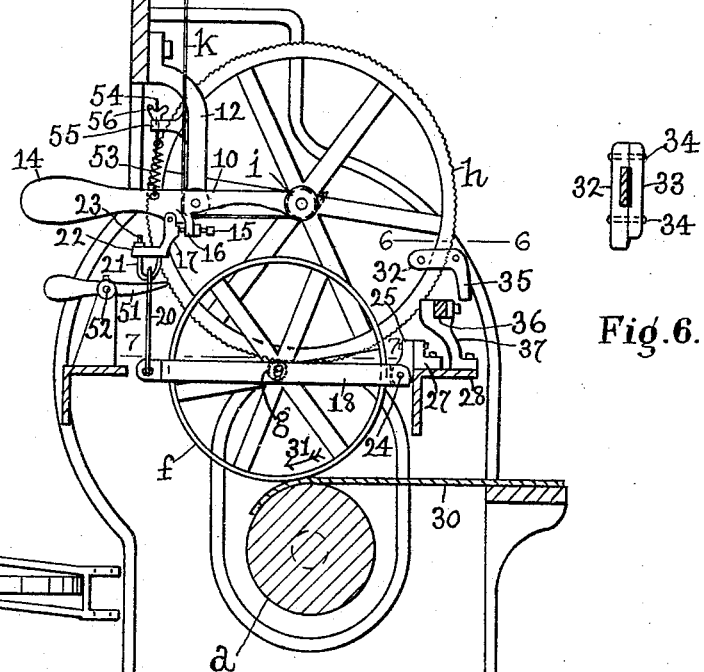
Fig. 6.
Fig. 7.
Fig. 4.
Witnesses.
C. H. Garrett
J. Murphy
Inventor.
Lyndon O. Ramsdell
by Jas. H. Churchill
Atty.

UNITED STATES PATENT OFFICE.

LYNDON O. RAMSDELL, OF SALEM, MASSACHUSETTS, ASSIGNOR TO PEABODY LEATHER MACHINERY COMPANY, OF PEABODY, MASSACHUSETTS, A CORPORATION.

MACHINE FOR MEASURING SURFACE AREAS.

No. 931,144.           Specification of Letters Patent.          Patented Aug. 17, 1909.

Application filed January 16, 1908. Serial No. 411,044.

*To all whom it may concern:*

Be it known that I, LYNDON O. RAMSDELL, a citizen of the United States, residing in Salem, in the county of Essex and State of Massachusetts, have invented an Improvement in Machines for Measuring Surface Areas, of which the following description, in connection with the accompanying drawings, is a specification, like characters on the drawings representing like parts.

This invention relates to a machine for measuring surface areas and more particularly the surface areas of hides, skins and leather.

The invention is an improvement upon measuring machines of that class commonly known as the Sawyer, in which a pointer or index is actuated by rotation of toothed wheels or segments, which in turn are rotated by measuring wheels making contact with the hide, skin or leather being measured.

The present invention has for its object to provide a machine of the class described, which is of increased efficiency and accuracy as will be described. For this purpose, provision is made for adjusting the individual segments or toothed wheels so as to overcome the variation in the counterbalances for said segments or toothed wheels and in the segments or wheels themselves and thereby enable the latter to be properly balanced and brought into close proximity to their driving pinions, said adjustment being accessible to the operator. Provision is also made for maintaining the accuracy of the machine by providing the toothed wheel or segment with a combined weight and stop, which is adjustable or movable thereon circumferentially, so that when a portion of its teeth become worn, the toothed wheel may be turned so as to bring unworn teeth into operation, as will be described.

The invention further has for its object to avoid backward movement of the pointer beyond the zero mark on the dial, when the toothed wheels or segments are returned to their starting position, thereby increasing the accuracy of the machine.

These and other features of this invention will be pointed out in the claims at the end of this specification.

Figure 2:
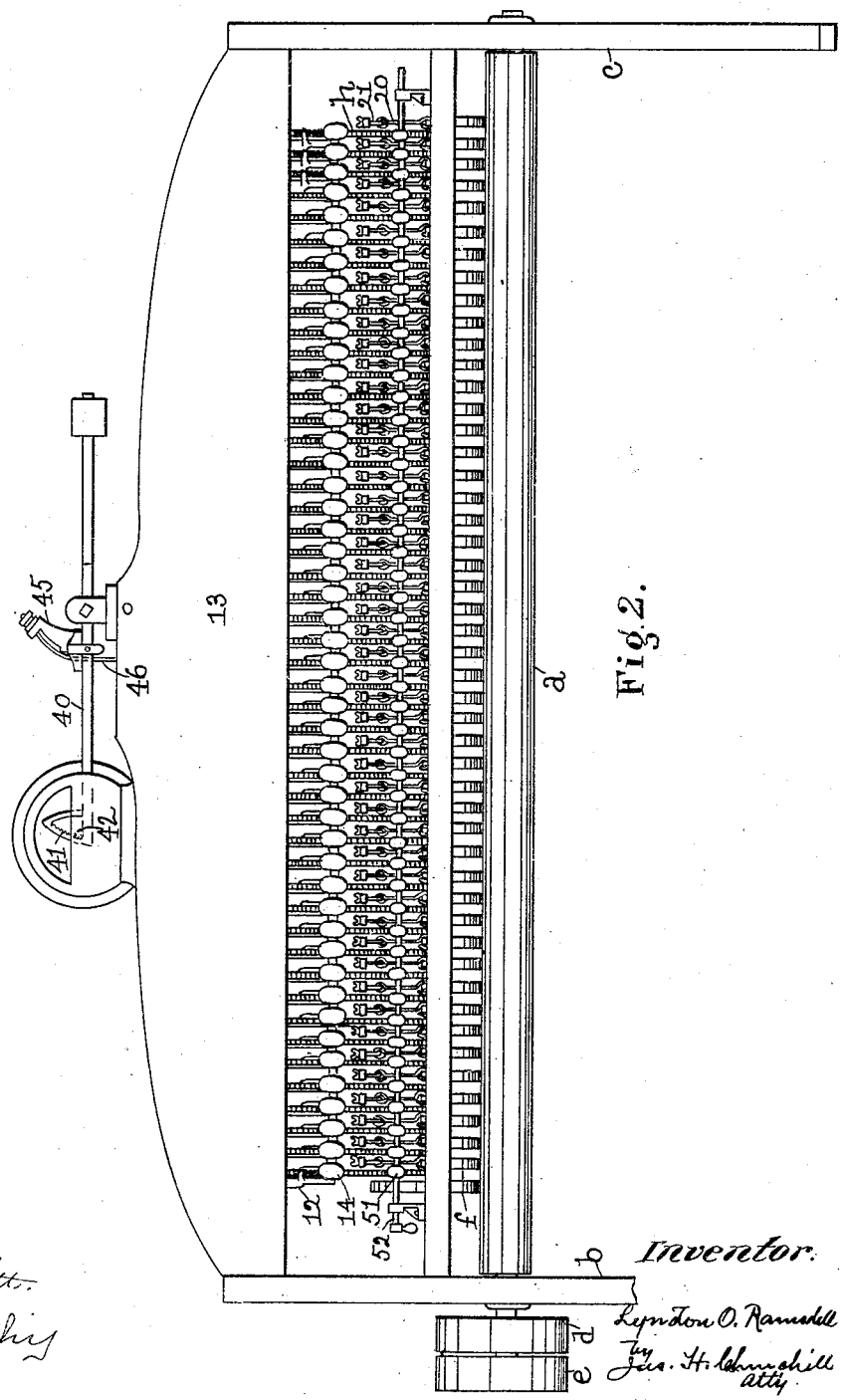
Figure 3:
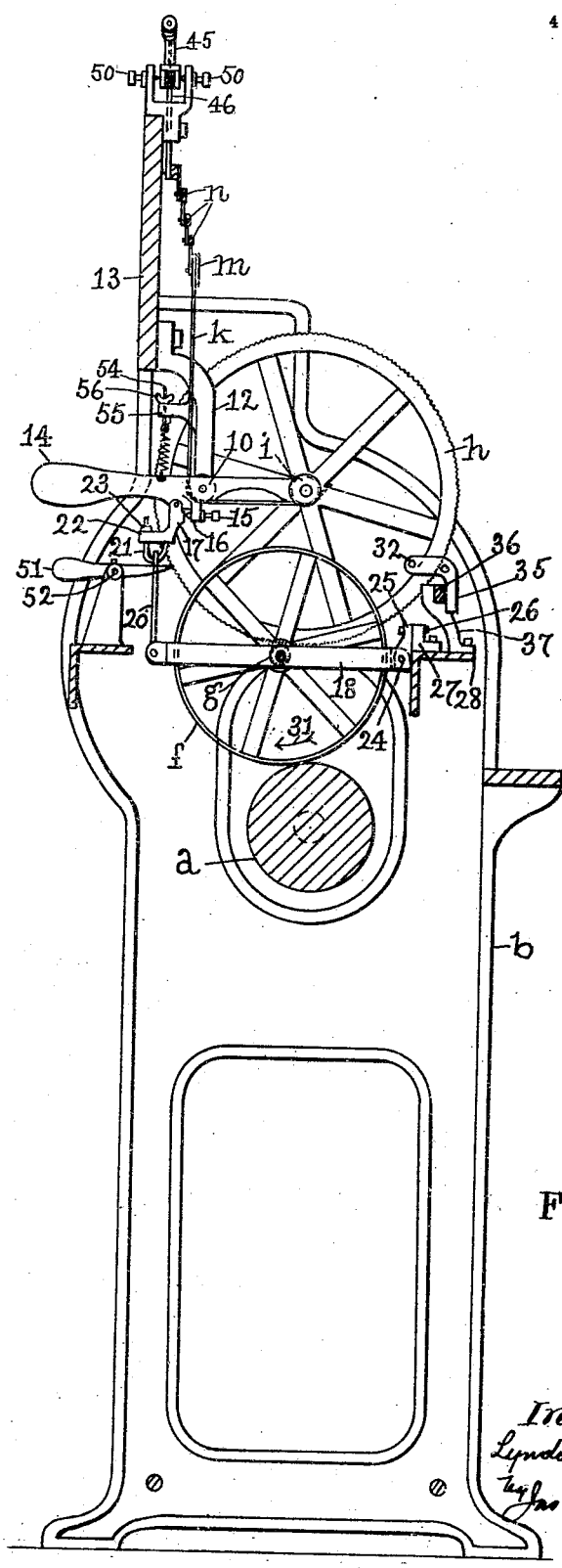

Figure 1 is a front elevation of a surface measuring machine embodying this invention. Fig. 2, a rear elevation of the machine shown in Fig. 1. Fig. 3, a vertical section of the machine shown in Fig. 1 taken on the line 3—3. Fig. 4, a view like Fig. 3, showing the machine in operation. Fig. 5, a detail in plan to be referred to, on the line 5—5, Fig. 4. Fig. 6, a detail in section, taken on the line 6—6, Fig. 4, and Fig. 7, a detail in plan of one of the levers carrying the measuring wheels.

Referring to the drawings, $a$ represents a rotatable bed roll supported in the upright sides $b$, $c$, of the framework of the machine. The bed roll $a$ is provided with the usual pulleys $d$, $e$, and has coöperating with it a series of measuring wheels $f$, provided with pinions $g$, which are designed to rotate toothed devices, shown in the present instance as wheels $h$, having grooved hubs or pulleys $i$, which are operatively connected with an index or pointer $j$ by means of a system of cords $k$, pulleys $m$, and levers $n$. The parts of the machine as thus far described are in general the same or substantially the same as those found in the well-known Sawyer measuring machine. Each toothed wheel $h$ is mounted in one end of a lever 10, pivoted intermediate its ends to an arm 12, depending from the cross piece 13 of the framework of the machine, said lever having an enlarged arm 14 forming a counterbalance for the toothed wheel $h$. The levers 10 are usually made of cast metal and the arm 14 varies in different levers, and the present invention has for one of its objects to overcome inaccuracy in the machine due to this variation in the levers 10. To this end provision is made, whereby the levers 10 may be adjusted from the rear of the machine, so that the said levers with their toothed wheels $h$ may be balanced and in this condition brought in close proximity to the driving pinions $g$.

In the present instance, I have shown one construction for accomplishing this result, which consists in an adjusting screw 15 extended through a finger or lug 16, depending from the lever 10 near its center and coöperating with a bent lever 17, pivoted at its upper end to the arm 14 of the lever 10 and having its free end connected to the free end of the lever 18, which supports the measuring wheel $f$, with whose pinion $g$ the toothed wheel $h$ coöperates. The connection between the levers 10, 18, may be adjustable, and in the present instance, the lever 18 has pivotally connected with it a link 20, whose upper end is bent or curved to form a hook which engages a substantially U-shaped rod 21, which is extended up through the arm 22 of the lever 17 and has one leg or member engaging the upright portion of the lever 17 and the other leg or member threaded to be engaged by a nut 23, by means of which the connection between the levers 10, 18 may be lengthened or shortened so as to properly adjust the measuring wheel $f$ with relation to the bed roll, the lever 18 being pivoted at 24 to a block or piece 25, which is fastened as by bolts 26 to a lug 27 secured to a cross bar 28 of the framework, and so as to adjust the toothed wheel or segment with relation to its driving pinion $g$.

From an inspection of Fig. 3, it will be seen, that by turning the screw 15, the counterbalancing arm 14 may be raised or lowered, until the lever 10 carrying the toothed device or wheel $h$ is balanced or substantially balanced, after which the nut 23 may be turned so as to lengthen or shorten the connection between the levers 10, 18, and thereby permit the lever 10 to turn on its pivot, so as to bring the toothed device or wheel $h$ nearer to or farther from its driving pinion $g$. By the two independent adjustments for the lever 10 above described, the same frictional contact of all the measuring wheels $f$ with the hide, skin or leather is obtained, notwithstanding the fact that the counterbalances 14 of the different levers 10 may vary in weight, and also notwithstanding the fact that the toothed wheels or devices may also vary in weight. To illustrate: If the weight of some of the toothed devices or wheels $h$, should be greater than that of others, the heavier wheels, in the absence of the adjusting means for effecting a balance between the heavier wheels and their counterweights (shown in the present instance as the screw 15), would cause the measuring wheels $f$ connected to them to be lifted away from the bed roll a greater distance than the measuring wheels connected with the lighter toothed wheels, and as a result the friction or contact between the measuring wheels which are connected with the heavier toothed wheels is less than that of the measuring wheels connected with the lighter toothed wheels, and consequently the measurement effected by some of the measuring wheels will be less than that effected by other measuring wheels. In other words, the machine does not measure uniformly and accurately with materials of different thickness. In the present instance, by providing the independent adjustments for the toothed devices, variation in weight in the toothed devices and also in the counterbalances are compensated for, so that all the levers carrying the toothed devices may be perfectly balanced, without disturbing the measuring wheels, which at such time may rest upon the bed roll or may be raised so as to just clear the same, and when the levers carrying the toothed devices are thus balanced, they may be adjusted by the nuts 23, so as to bring the toothed wheels nearer to or farther from their driving pinions $g$. By means of the double adjustment above referred to, all the measuring wheels which are raised by the hide, skin or leather 30 are engaged simultaneously or substantially so with their coöperating toothed wheels $h$, and with the same frictional contact with the hide, skin or leather, irrespective of the thickness of the latter, with the result that a more accurate and efficient measuring machine is obtained, and one which is capable of accurately measuring hides, skins or leather of different thickness.

The measuring wheels are rotated in the direction of the arrow 31 by the hide, skin or leather 30, as the latter is fed through the machine by the rotatable bed roll $a$, and inasmuch as the extent of rotation varies with the size of the hide, skin or leather, it follows that some of the teeth of the wheels $h$ are used more than others and therefore become worn in time, with the result that inaccuracies occur from this source.

The present invention has for one of its objects to overcome this objectionable feature, and this result is obtained by providing the toothed wheel with a weight and stop which is adjusted circumferentially of the toothed wheel, so that when a portion of the teeth of the wheel $h$ becomes worn, the weight and stop can be adjusted circumferentially so as to bring an unworn portion of the teeth of the wheel $h$ into operative relation to the driving pinion.

In the present instance, the weight and stop is composed of two parts or members 32, 33, which are located on opposite sides of the rim of the wheel $h$ and are clamped thereto by the screws 34 (see Figs. 3 and 6). One of the members as 32 is provided with a bent portion or arm 35, which forms a stop arm and coöperates with a cross bar 36 secured to brackets 37 erected upon the cross bar 28 of the framework. When the machine is at rest, the stop arms 35 of the toothed wheels $h$ engage the stop bar 36 as shown in Fig. 3.

While I may prefer the construction of the combined weight and stop, herein shown, I do not desire to limit my invention to the particular construction shown.

The invention further has for its object to increase the accuracy of the machine by avoiding uneven wear on the pivot or fulcrum for the main lever 40, which actuates the pointer $j$ and also the rack bar 41 and the pinion 42 in mesh with said rack bar. This result is obtained by providing the main lever 40 with a central opening 43

(see Fig. 5) through which the cord, chain or flexible connection 46 is passed and secured to the arm or upright 45 fastened to the upper surface of the main lever.

The central opening 43 may be formed in the lever 40 after the manner represented in Fig. 5, wherein the lever is shown as composed of a bar inserted between and secured to the bent ends of bars which are suitably secured together beyond the bent portion to form a single bar or piece.

By reference to Figs. 3 and 4, it will be seen that the cord 46 is central with relation to the pivots 50 for the main lever 40 and also with relation to the rack bar 41 and pinion 42, so that the pull upon the lever 40 is evenly distributed to both pivots and to the rack bar 41 and pinion 42, thereby avoiding uneven wear on these parts and consequently increasing the accuracy of the machine.

The levers 18 which support the measuring wheels $h$ may and preferably will be made double as represented in Fig 7, that is, each lever is composed of two side bars connected by end bars, the said side bars being offset at their center to permit the measuring wheels to be assembled close together and have the pinions $g$ in line with the toothed wheels $h$. This construction of lever enables the same to be made lighter without weakening it. The toothed wheels $h$ have coöperating with them holding pawls 51 mounted on a rock shaft 52 located at the rear of the machine. It will also be noticed that the mechanism for adjusting the counterbalanced levers 10 is located at the rear of the machine and is readily accessible.

If desired, the levers 10 may have connected to them one end of springs 53 having their other ends connected to threaded rods 54, extended through lugs or projections 55 on the arms 12 and engaged by nuts 56, by means of which the strength of the springs may be adjusted, so as to hold the levers in their normal position with the wheels $h$ in close proximity to the pinions $g$, and thereby prevent the said wheels jumping or being moved unevenly when the hide, skin or leather is carelessly introduced between the measuring wheels and the bed roll.

Claims.

1. In a machine of the character described, in combination, a bed roll, a plurality of measuring wheels coöperating therewith, levers on which said measuring wheels are mounted, pinions carried by said wheels, a plurality of rotatable toothed wheels coöperating with said pinions, levers on which said toothed wheels are mounted at one side of the pivots for said levers, weighted arms on the other side of said pivots to counterbalance said toothed wheels, mechanism connecting the toothed wheel levers with the measuring wheel levers, and means carried by the toothed wheel levers and coöperating with said connecting mechanism to move said toothed wheel levers on their pivots without effecting movement of the measuring wheels, for the purpose specified.

2. In a machine of the character described, in combination, a plurality of measuring wheels, pinions connected with said wheels, a plurality of toothed wheels coöperating with said pinions to be rotated thereby in one direction, and means adjustable circumferentially on said toothed wheels for moving them in the opposite direction, substantially as described.

3. In a machine of the character described, in combination, a plurality of rotatable measuring wheels, pinions connected with said wheels, a plurality of rotatable toothed devices coöperating with said pinions to be rotated in one direction thereby, and a combined weight and stop arm circumferentially adjustable on said toothed device, substantially as described.

4. In a machine of the character described, in combination, a pointer or index, a pinion to rotate it, a rack bar in mesh with said pinion, a lever to which said rack bar is connected, said lever having a vertical hole or opening extended centrally through it, and a flexible connection extended through said opening and secured to the said lever above the upper surface thereof and in the plane of said opening, substantially as described.

5. In a machine of the character described, in combination, a plurality of measuring wheels, a plurality of toothed devices rotatable by rotation of said measuring wheels, levers pivoted intermediate their ends and carrying said toothed devices and provided with weighted arms to counterbalance the said toothed devices, movable supports for said measuring wheels, means connecting said supports with the levers carrying the said toothed devices, and means coöperating with said connecting means to turn the levers carrying the toothed devices to effect movement of the said levers independently of the movable supports for the measuring wheels, substantially as described.

6. In a machine of the character described, in combination a rotatable toothed device, a stop arm adjustably secured to the circumference of said toothed device and extended beyond the circumference of said toothed device, and means located beyond the circumference of the toothed device with which said stop arm coöperates, for the purpose specified.

7. In a machine of the character described, in combination, a rotatable toothed device, a lever pivoted intermediate its ends and carrying said toothed device at one side of its pivot and provided with a weighted arm on the other side of said pivot, a measuring wheel provided with a pinion coöperating with said toothed device, a lever carrying said measuring wheel, an adjustable connection between said levers comprising the lever 17, U-shaped rod 21 carried by the lever 17, nut on said rod, and link 20, and a set screw 15 carried by the toothed device lever and coöperating with the lever 17, substantially as described.

8. In a machine of the character described, in combination, a measuring wheel, a toothed device rotatable by rotation of said measuring wheel, supports for said wheel and toothed device, means to connect said supports having means to adjust said connection to shorten and lengthen the same, and means to effect movement of one of said supports independently of the other, substantially as described.

9. In a machine of the character described, in combination, a measuring wheel, a toothed device rotatable by rotation of said measuring wheel, a lever supporting said wheel, a lever supporting said toothed device, a connection between said levers pivoted thereto and having provision for lengthening and shortening the same, and means coöperating with said connection for turning one of said levers on its pivot independently of the other, substantially as described.

10. In a machine of the character described, in combination, a measuring wheel, a toothed device rotatable by rotation of said measuring wheel, a lever supporting said wheel, a lever supporting said toothed device, means to turn the lever carrying the toothed device on its pivot to counterbalance said lever, and means for effecting simultaneous adjustment of said levers without disturbing the counterbalanced condition of the lever carrying the toothed device, substantially as described.

In testimony whereof, I have signed my name to this specification in the presence of two subscribing witnesses.

LYNDON O. RAMSDELL.

Witnesses:
JAS. H. CHURCHILL,
J. MURPHY.